United States Patent
Zhang et al.

(10) Patent No.: US 8,441,990 B2
(45) Date of Patent: May 14, 2013

(54) METHOD AND SYSTEM FOR SHARING REVERSE CHANNEL IN TRUNK COMMUNICATION SYSTEM

(75) Inventors: Wanshuai Zhang, Shenzhen (CN); Guo Yang, Shenzhen (CN); Zihua Xu, Shenzhen (CN); Zongzheng Li, Shenzhen (CN); Yiling Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 909 days.

(21) Appl. No.: 12/064,551

(22) PCT Filed: Jul. 14, 2006

(86) PCT No.: PCT/CN2006/001668
§ 371 (c)(1),
(2), (4) Date: Jun. 27, 2008

(87) PCT Pub. No.: WO2007/036111
PCT Pub. Date: Apr. 5, 2007

(65) Prior Publication Data
US 2009/0016283 A1 Jan. 15, 2009

(30) Foreign Application Priority Data
Sep. 29, 2005 (CN) .......................... 2005 1 0100146

(51) Int. Cl.
*H04W 4/00* (2009.01)
*H04L 12/28* (2006.01)
(52) U.S. Cl.
USPC ...................... 370/329; 370/395.4

(58) Field of Classification Search ............... 370/310, 370/328, 329, 338, 395.4
See application file for complete search history.

(56) References Cited

U.S. PATENT DOCUMENTS

| | | | |
|---|---|---|---|
| 6,226,282 B1 * | 5/2001 | Chung ........................... | 370/335 |
| 6,456,604 B1 * | 9/2002 | Lee et al. ....................... | 370/328 |
| 6,907,247 B2 * | 6/2005 | Thompson et al. ........... | 455/450 |
| 2002/0101839 A1 * | 8/2002 | Farley et al. .................. | 370/329 |
| 2002/0181423 A1 * | 12/2002 | Chen et al. .................... | 370/337 |
| 2004/0228349 A1 * | 11/2004 | Vrzic et al. ................... | 370/395.4 |
| 2008/0123613 A1 * | 5/2008 | Fang .............................. | 370/342 |
| 2009/0036118 A1 * | 2/2009 | Liu et al. ....................... | 455/426.1 |
| 2009/0221292 A1 * | 9/2009 | Lundh et al. .................. | 455/445 |
| 2012/0044923 A1 * | 2/2012 | Dateki .......................... | 370/338 |
| 2012/0307809 A1 * | 12/2012 | Farley et al. .................. | 370/336 |

\* cited by examiner

Primary Examiner — Warner Wong
(74) Attorney, Agent, or Firm — Bright IP Law Offices

(57) ABSTRACT

A method for sharing reverse channel in trunk communication system includes: step A, establishing a forward channel and one or more in a group: step B, mobile stations in idle state determine a sharing reverse channel that can be used based on information of the sharing reverse channel; step C, the mobile station transmits information through the sharing reverse channel. Furthermore a system for sharing reverse channel in trunk communication system includes: channel establishing means, for establishing a forward channel and one or more in a group; reverse channel determining means, for determining a sharing reverse channel that can be used by a mobile station based on the information of the sharing reverse channel; reverse channel information transmitting means, for transmitting information through the sharing reverse channel. This invention saves the air and physics sources of the system, and reduces the collision probability of the signaling of each mobile station in idle state.

30 Claims, 4 Drawing Sheets

METHOD AND SYSTEM FOR SHARING REVERSE CHANNEL IN TRUNK COMMUNICATION SYSTEM

FIELD OF THE INVENTION

The invention relates to the field of mobile communication technique, particularly to a system and method for sharing reverse channel in DO (Data Only) trunk communication system, causing all mobile stations in idle state in a group under a sector to send signaling by the established shared reverse channels, which are also called "sharing reverse channels" hereinafter.

BACKGROUND OF THE INVENTION

The trunk communication systems are the systems in which a group wireless channels shared by multiple mobile stations and the private mobile communication systems of these channels are used dynamically. They are mainly applied to corporations and enterprises, police, policeman and army and etc which have higher demand for functions of command, dispatching.

The use strategy of present trunk communication systems forward channels is; only one mobile station is active state in one group at one time, the mobile station data sent forward in the group are same, i.e., the mobile stations in the group share forward channels. But for the use of reverse channels, there are two present manners:

First manner, the mobile stations in the group in a cell, comprising mobile stations in active state and mobile stations in idle state, establish each reverse channels for sending signaling information respectively.

Second manner, the mobile stations in idle state in the group in a cell only establish a sharing reverse channel for sending signaling information, all mobile stations in idle state use the sharing reverse channel in the manner of anticipating occupy.

For the large-scale dispatching systems concentrating a mass of mobile stations within a certain region range, the above first manner needs to establish each reverse channels for a mass of mobile stations within the group in a cell. This manner is hard to realize in both air resource and physical resource. That is to say, the limit of resources cause the number of the groups in a cell and the number of the mobile stations in the groups are limited considerably.

In the second manner, the mobile stations in the groups share a reverse channel, when the mobile stations send reverse signaling on this shared channel, the signaling on different mobile stations are prone to collide, causing the mobile stations signaling sending failure and reducing the air capability.

SUMMARY OF THE INVENTION

The invention is proposed in view of above problems, thus, the objective of the invention is to provide a method for sharing reverse channel in trunk communication system to save the air interface resource and physical resource of the system.

According to one aspect of the present invention, a method for sharing reverse channel in trunk communication system is provided, comprising the steps of: step A, establishing a forward channel and one or more sharing reverse channels in a group; step B, mobile stations in idle state determine a sharing reverse channel which could be used by the mobile stations according to the sharing reverse channel information; and step C, the mobile station transmits information through the sharing reverse channels.

Specially, information of the one or more sharing reverse channels could be broadcasted on the forward channel continuously or periodically/unperiodically alternatively. Further, the information of the sharing reverse channels could be preset by the trunk communication system.

Further, the forward channel and the one or more sharing reverse channels could be established based on at least one of the following information: the number of the mobile stations in the group, the number of base station resource and air interface wireless resource. One sharing reverse channel which could be used by the mobile stations is determined by ways of the randomization calculating relative to a terminal identification number. The information of the sharing reverse channels includes at least one of: the number of the sharing reverse channels and the information generated by the sharing reverse channels using long code mask.

Further, the randomization calculating could comprise at least one of: HASH function using the terminal identification number as input parameter and the terminal identification number for calculating the number of the sharing reverse channels. The terminal identification number could comprise at least one of: terminal electronic sequence number and unicast access terminal identifier.

Further, when the mobile stations in idle state have to send reverse signaling on the sharing reverse channels, it further comprises the following two steps of: step E, the mobile stations in idle state turning on reverse emission powers and send the reverse signaling; and step F, after sending the reverse signaling, the mobile stations in idle state turning down the reverse emission powers.

Further, it could comprises the following steps of: step G adding priority identifiers each corresponding to every sharing reverse channel in the information of the sharing reverse channels; step H, after receiving the information of the sharing reverse channels, the mobile stations in idle state comparing the priorities thereof with the priorities of the sharing reverse channels, if the priorities of the sharing reverse channels are higher than the priorities of the mobile stations, the mobile stations couldn't send the reverse signaling using the sharing reverse channels, or otherwise, the mobile stations determine that the priorities thereof are higher than or equal to the channels number M of the priorities of the sharing reverse channels, and determine a sharing reverse channel for the mobile stations by ways of the randomization calculating to send the reverse signaling.

According to another aspect of the present invention, a system for sharing reverse channels in a trunk communication system is provided, comprising the means of: a channel establishing means for establishing a forward channel and one or more sharing reverse channels in a group; a reverse channel determining means for determining a sharing reverse channel which could be used by mobile stations according to the sharing reverse channel information; and a reverse channel information transmitting means for transmitting information through the sharing reverse channels. Further, it could comprises a reverse channel information broadcasting means for broadcasting information of the one or more sharing reverse channels on the forward channel continuously or periodically/unperiodically alternatively. Further, the information of the sharing reverse channel could be preset by the trunk communication system. Preferably, the forward channel and the one or more sharing reverse channels could be established based on at least one of the following information: the number of the mobile stations in the group, the number of base station resources, and air interface wireless resource.

One sharing reverse channel which could be used by the mobile stations is determined by ways of the randomization calculating relative to a terminal identification number. The randomization calculating could comprise at least one of: HASH function using the terminal identification number as input parameter and the terminal identification number for calculating the number of the sharing reverse channels. The terminal identification number could comprise at least one of: terminal electronic sequence number and unicast access terminal identifier. The information of the sharing reverse channels could include at least one of: the number of the sharing reverse channels and the information generated by the sharing reverse channels using long code mask.

Specially, it further comprises following two means of: a power emission turning on means for causing the mobile stations in idle state turning on reverse emission powers and send the reverse signaling; and a power emission turning down means for causing the mobile stations in idle state turning down the reverse emission powers after sending reverse signaling.

Further, the system further the following means of a reverse channel priority identification means for adding priority identifiers each corresponding to every sharing reverse channel in the information of the sharing reverse channels; and a reverse channel priority comparing means for comparing the priorities thereof with the priorities of the sharing reverse channels after the mobile stations in idle state receiving the information of the sharing reverse channels, if the priorities of the sharing reverse channels are higher than the priorities of the mobile stations, the mobile stations couldn't send the reverse signaling using the sharing reverse channels, or otherwise, the mobile stations determine that the priorities thereof are higher than or equal to the channels number M of the priorities of the sharing reverse channels, and determine a sharing reverse channel for the mobile stations by ways of the randomization calculating to send the reverse signaling.

The invention causes that all mobile stations in idle state in the same group under a cell could be distributed over multiple sharing reverse channels by above operation steps and pass the signaling such as the reverse floor request and etc of the mobile stations in idle state in the sharing reverse channel groups. Therefore, no matter how many calling mobile stations of a same group are centralized in the cell, only several reverse channels are occupied on the base station side, saving the air interface resource and physical resource of the systems considerably. As the mobile stations in idle state are distributed on several sharing reverse channels, the collision probabilities of each mobile stations in idle state are reduced.

BRIEF DESCRIPTION OF THE DRAWINGS

The accompanying drawings briefly described below illustrate exemplary embodiments of the present invention and, together with the description, serve to explain the principles of the present invention.

EMBODIMENTS OF THE INVENTION

The present invention will be further described in detail with reference to the accompanying drawings and the embodiment thereof.

Figure 1:
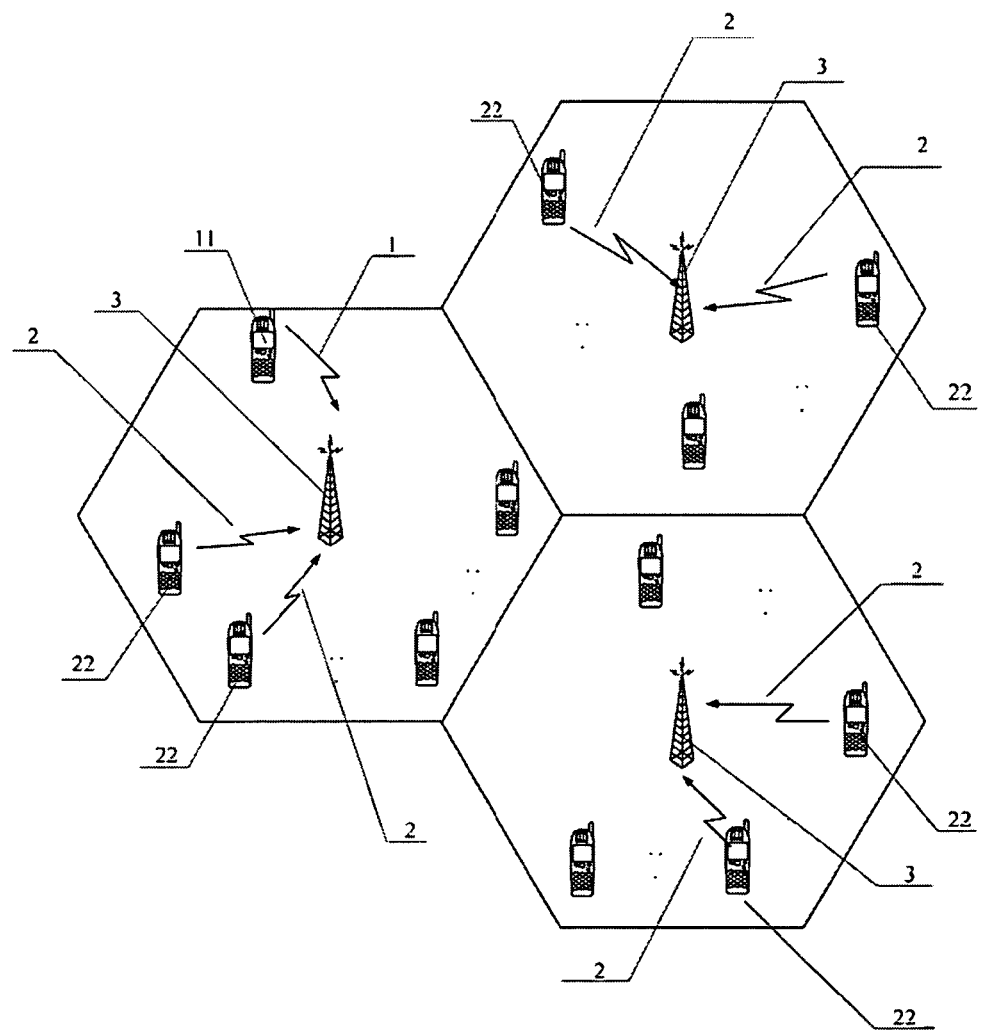
FIG. 1 is a schematic diagram of the sharing reverse channels within a cell in a DO trunk communication system of the present invention.

FIG. 1 is a schematic diagram of the sharing reverse channels within a cell in a DO trunk communication system of the present invention. In the forward link of the DO trunk systems, the mobile stations in the group share the broadcast channel and the forward traffic channel. The broadcast channel is used for transmitting the forward voice, the forward traffic channel is used for transmitting signaling. On the reverse link, the private reverse channel 1 is established for the mobile station 11 in active state in the group for sending the reverse voice and signaling of the mobile station in active state. The mobile station 22 in idle state in each sector in the group establishes sharing reverse channels 2 (multiple) for sending, to a base station 3, the short signaling such as the floor request and etc of the mobile stations in idle state.

Figure 2:
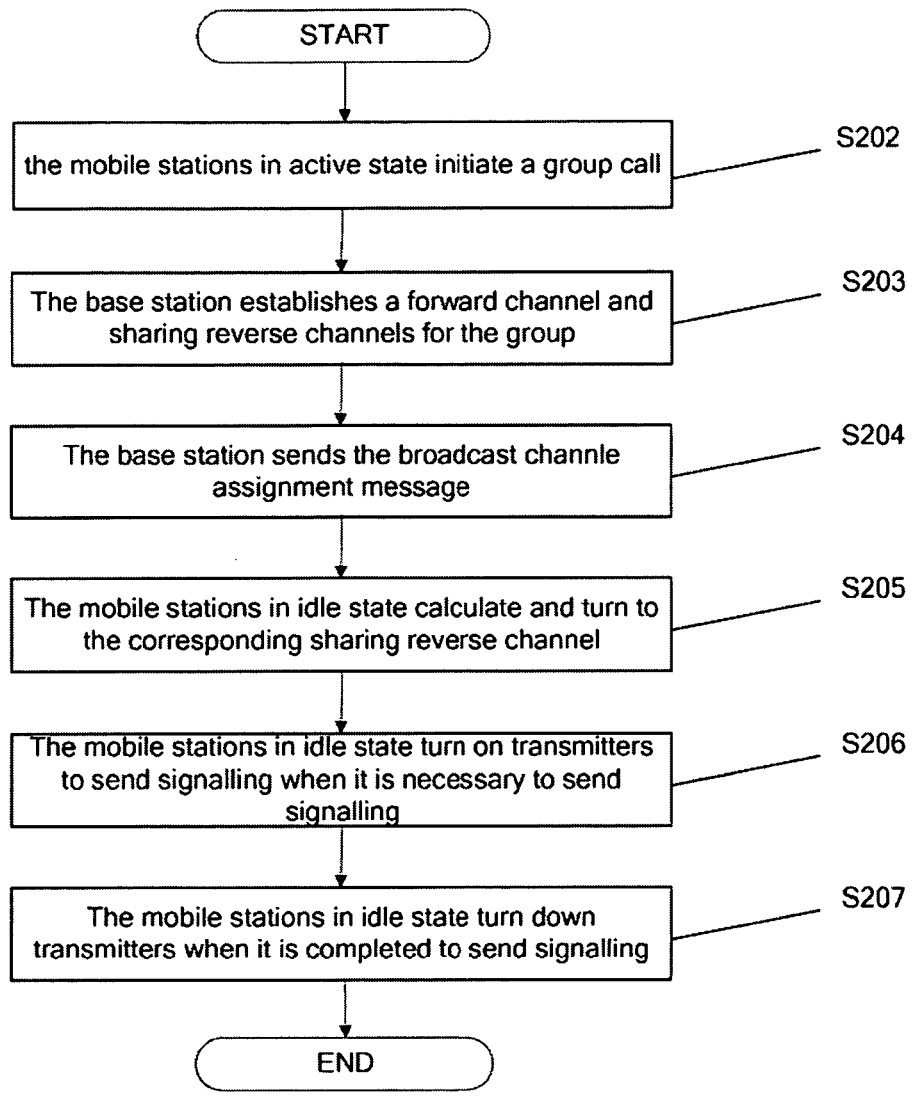
FIG. 2 is a flowchart showing the method for sharing reverse channels in DO trunk communication system according to one embodiment of the present invention.

FIG. 2 is a flowchart showing the method for sharing reverse channels in DO trunk communication system according to one embodiment of the present invention. The method for establishing the sharing reverse channel is:

Step S202, the mobile stations in active state initiate a call, the trunk communication system acknowledges that this call is a group call;

Step S203, the dispatching subsystem establishes the forward channel for the mobile stations in active state through the base station according to a certain strategy, such as how many mobile stations in the group and how many physical resource of the base station, and establish multiple sharing reverse channels for the mobile stations in idle state in the group.

Step S204, the base station sends the broadcast channel assignment message on the control channel, the message content comprising the number N of sharing reverse channels established in the above steps and the generation manner of the long code mask;

Step S205, the mobile stations in idle state in the group receive the broadcast channel assignment message, acknowledge the number N of sharing reverse channels according to the message content, according to fixed rule (such as HASH function or calculate according to the terminal electronic sequence number ESN (ESN mod shared channels number)), then calculate a corresponding sharing reverse channel by HASH function according to its UATI (unicast access terminal identifier), then turn to the channel, at this time the idle state mobile stations transmitters are turned down;

Step S206, if the mobile stations in idle state need to send signaling on sharing reverse channels thereof, then turning on the transmitters and transmit signaling;

Step S207, the mobile stations in idle state turn down transmitters after sending signaling.

Figure 3:
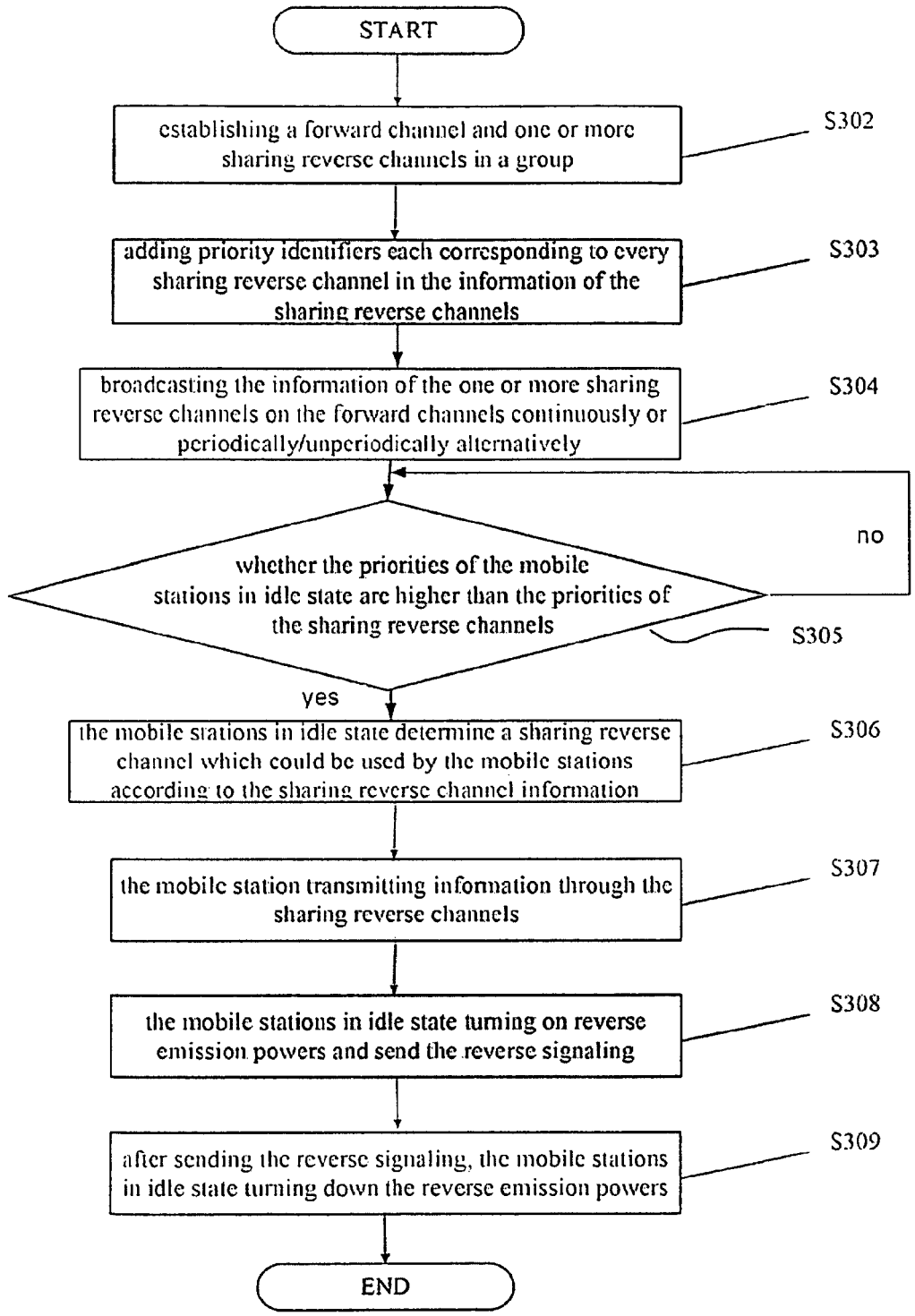
FIG. 3 is a flowchart showing the method for sharing reverse channels in DO trunk communication system according to another embodiment of the present invention.

FIG. 3 is a flowchart showing the method for sharing reverse channels in DO trunk communication system according to another embodiment of the present invention. The method comprises the steps of:

Step S302, establishing a forward channel and one or more sharing reverse channels in a group.

Step S303, adding priority identifiers each corresponding to ever), sharing reverse channel in the information of the sharing reverse channels;

Step S304, broadcasting the information of the one or more sharing reverse channels on the forward channels continuously or periodically/unperiodically alternatively:

Step S305, after receiving the information of the sharing reverse channels, the mobile stations in idle state comparing the priorities thereof with the priorities of the sharing reverse channels, if the priorities of the sharing reverse channels are higher than the priorities of the mobile stations, the mobile stations couldn't send the reverse signaling using the sharing reverse channels, or otherwise, the mobile stations determine that the priorities thereof are higher than or equal to the channels number M of the priorities of the sharing reverse channels, and determine a sharing reverse channel for the mobile stations by ways of the randomization calculating to send the reverse signaling;

Step S306, the mobile stations in idle state determine a sharing reverse channel which could be used by the mobile stations according to the sharing reverse channel information;

Step S307, the mobile station transmitting information through the sharing reverse channels;

Step S308, the mobile stations in idle state turning on reverse emission powers and send the reverse signaling;

Step S309, after sending the reverse signaling, the mobile stations in idle state turning down the reverse emission powers.

Therein, specially, the information of the sharing reverse channels could also be preset by the trunk communication system.

Figure 4:
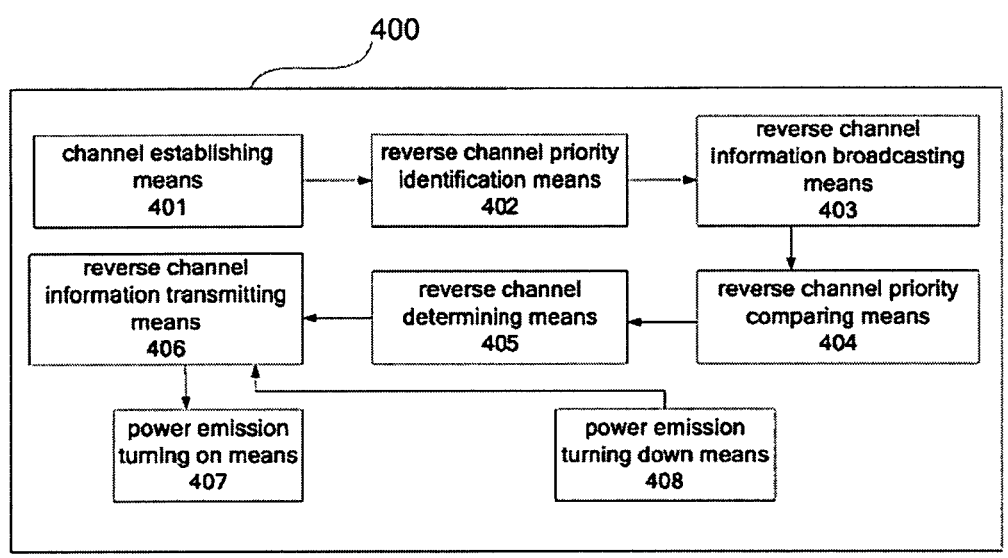
FIG. 4 is a structure diagram of DO trunk communication system according to one embodiment of the present invention.

FIG. 4 is a structure diagram of DO trunk communication system according to one embodiment of the present invention. The system for sharing reverse channels in a trunk communication system 400 according to the invention comprises the means of: a channel establishing means 401 for establishing a forward channel and one or more sharing reverse channels in a group; a reverse channel priority identification means 402 for adding priority identifiers each corresponding to every sharing reverse channel in the information of the sharing reverse channels; a reverse channel information broadcasting means 403 for broadcasting information of the one or more sharing reverse channels on the forward channel continuously or periodically/unperiodically alternatively; a reverse channel priority, comparing means 404, for comparing the priorities thereof with the priorities of the sharing reverse channels after receiving the information of the sharing reverse channels, if the priorities of the sharing reverse channels are higher than the priorities of the mobile stations, the mobile stations couldn't send the reverse signaling using the sharing reverse channels, or otherwise, the mobile stations determine that the priorities thereof are higher than or equal to the channels number M of the priorities of the sharing reverse channels, and determine a sharing reverse channel for the mobile stations by ways of the randomization calculating to send the reverse signaling.

The system for sharing reverse channels further comprises: a reverse channel determining means 405 for determining a sharing reverse channel which could be used by the mobile stations according to the sharing reverse channel information; a reverse channel information transmitting means 406 for transmitting information through the sharing reverse channels; a power emission turning on means 407 for the mobile stations in idle state turning on reverse emission powers and send the reverse signaling, and a power emission turning down means 408 for the mobile stations in idle state turning down the reverse emission powers after sending reverse signaling.

The system for sharing reverse channels in a trunk communication system 400 according to the invention will be described in detail with reference to FIG. 4.

In DO trunk system the channel establishing means 401 establishes a forward channel and one or more sharing reverse channels in a group; the reverse channel priority identification means 402 adds priority identifiers each corresponding to every sharing reverse channel in the information of the sharing reverse channels, wherein the priorities of the sharing reverse channels could be high, middle, low level and could be the level of the number identifier. The reverse channel information broadcasting means 403 broadcasts information of the one or more sharing reverse channels on the forward channel continuously or periodically/unperiodically alternatively so as to delay the access of the mobile stations. After the mobile stations in idle state receiving the information of the sharing reverse channels, the reverse channel priority comparing means 404 compares the priorities thereof with the priorities of the sharing reverse channels, if the priorities of the sharing reverse channels are higher than the priorities of the mobile stations, the mobile stations couldn't send the reverse signaling using the sharing reverse channels, or otherwise, the mobile stations determine that the priorities thereof are higher than or equal to the channels number M of the priorities of the sharing reverse channels, and determine a sharing reverse channel for the mobile stations by ways of the randomization calculating to send the reverse signaling. The reverse channel determining means 405 determines a sharing reverse channel which could be used by mobile stations according to the sharing reverse channel information. The power emission turning on means 407 causes the mobile stations in idle state turning on reverse emission powers and send the reverse signaling, the power emission turning down means 408 causes the mobile stations in idle state turning down the reverse emission powers after sending reverse signaling.

In summary, by ways of the method for sharing reverse channels proposed in the present invention, the air interface resource and physical resource could be saved and the collision probabilities of non-active state mobile stations are reduced.

While this invention has been described in connection With what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for sharing reverse channels in a trunk communication system, comprising the steps of:

step A, establishing a forward channel and multiple sharing reverse channels in a group;

step B, a mobile station in idle state determining a sharing reverse channel which could be used by the mobile station according to information of the multiple sharing reverse channels; and step C, the mobile station transmitting information through the determined sharing reverse channel;

wherein the method further comprises the following steps:

step F, adding priority identifiers each corresponding to every sharing reverse channel in the information of the multiple sharing reverse channels; and step G, after receiving the information of the multiple sharing reverse channels, the mobile station in idle state comparing the priority thereof with the priorities of the multiple sharing reverse channels, and if a priority of a sharing reverse channel is higher than the priority of the mobile station, the mobile station being not able to send the reverse signaling by using the sharing reverse channel; or otherwise, the mobile station determining M sharing reverse channels with the priority of the mobile station being higher than or equal to the priorities of the M sharing reverse channels, and determining a sharing reverse channel from the M sharing reverse channels for the mobile station by way of the randomization calculating to send the reverse signaling.

2. The method for sharing reverse channels according to claim 1, wherein broadcasting the information of the multiple sharing reverse channels on the forward channel continuously or periodically/unperiodically alternatively.

3. The method for sharing reverse channels according to claim 1, wherein presetting the information of the multiple sharing reverse channels by the trunk communication system.

4. The method for sharing reverse channels according to claim 2, wherein establishing the forward channel and the multiple sharing reverse channels based on at least one of the following information: the number of the mobile stations in the group, the number of base station resources, and air interface wireless resource.

5. The method for sharing reverse channels according to claim 4, wherein determining the sharing reverse channel which could be used by the mobile station by way of the randomization calculating relative to a terminal identification number.

6. The method for sharing reverse channels according, to claim 5, wherein the randomization calculating comprises at least one of: HASH function using the terminal identification number as input parameter and the terminal identification number for calculating the number of the sharing reverse channels.

7. The method for sharing reverse channels according, to claim 5, wherein the terminal identification number comprises at least one of: terminal electronic sequence number and unicast access terminal identifier.

8. The method for sharing reverse channels according to claim 6, wherein the information of the sharing reverse channels includes at least one of: the number of the sharing reverse channels and the information generated by the sharing reverse channels using long code mask.

9. The method for sharing reverse channels according to claim 8, wherein further comprising the following two steps when the mobile station in idle state has to send reverse signaling on the sharing reverse channels:
step D, the mobile station in idle state turning on reverse emission powers and sending the reverse signaling; and
step E, after sending the reverse signaling, the mobile station in idle state turning down the reverse emission powers.

10. A system for sharing reverse channels in a trunk communication system, comprising the means of:
a channel establishing means for establishing a forward channel and multiple sharing reverse channels in a group;
a reverse channel determining means for determining a sharing reverse channel which could be used by a mobile station according to information of the multiple sharing reverse channel information; and
a reverse channel information transmitting means for transmitting information through the determined sharing reverse channel;
wherein the system further comprises the following means of:

a reverse channel priority identification means for adding priority identifiers each corresponding to every sharing reverse channel in the information of the multiple sharing reverse channels; and
a reverse channel priority comparing means for comparing the priority thereof with the priorities of the multiple sharing reverse channels after the mobile station in idle state receiving the information of the multiple sharing reverse channels, and if a priority of a sharing reverse channel is higher than the priority of the mobile station, the mobile station being not able to send the reverse signaling by using the sharing reverse channel; or otherwise, the mobile station determines M sharing reverse channels with the priority of the mobile station being higher than or equal to the priorities of the M sharing reverse channels, and determining a sharing reverse channel from the M sharing reverse channels for the mobile station by way of the randomization calculating to send the reverse signaling.

11. The system for sharing reverse channels according to claim 10, wherein further comprising:
a reverse channel information broadcasting means for broadcasting the information of the multiple sharing reverse channels on the forward channel continuously or periodically/unperiodically alternatively.

12. The system for sharing reverse channels according to claim 10, wherein the information of the multiple sharing reverse channels are preset by the trunk communication system.

13. The system for sharing reverse channels according to claim 11, wherein establishing the forward channel and the multiple sharing reverse channels based on at least one of the following information: the number of the mobile stations in the group, the number of base station resources, and air interface wireless resource.

14. The system for sharing reverse channels according to claim 13, wherein determining the sharing reverse channel which could be used by the mobile station by way of the randomization calculating relative to a terminal identification number.

15. The system for sharing reverse channels according to claim 14, wherein the randomization calculating comprises at least one of: HASH function using the terminal identification number as input parameter and the terminal identification number for calculating the number of the sharing reverse channels.

16. The system for sharing reverse channels according to claim 14, wherein the terminal identification number comprises at least one of: terminal electronic sequence number and unicast access terminal identifier.

17. The system for sharing reverse channels according to claim 15, wherein the information of the multiple sharing reverse channels includes at least one of the number of the sharing reverse, channels and the information generated by the Sharing reverse channels using long code mask.

18. The system for sharing reverse channels according to claim 17, wherein further comprising the following, two means of:
a power emission turning, on means for causing the mobile station in idle state turning on reverse emission powers and send the reverse signaling; and
a power emission turning down means for causing the mobile station in idle state turning down the reverse emission powers after sending reverse signaling.

19. The method for sharing reverse channels according to claim 3, wherein establishing the forward channel and the multiple sharing reverse channels based on at least one of the following information: the number of the mobile stations in the group, the number of base station resources, and air interface wireless resource.

20. The method for sharing reverse channels according to claim 19, wherein determining, the sharing reverse channel which could be used by the mobile station by way of the randomization calculating relative to a terminal identification number.

21. The method for sharing reverse channels according to claim 20, wherein the randomization calculating comprises at least one of: HASH function using the terminal identification number as input parameter and the terminal identification number for calculating the number of the sharing reverse channels.

22. The method for sharing reverse channels according to claim 20, wherein the terminal identification number comprises at least one of: terminal electronic sequence number and unicast access terminal identifier.

23. The method for sharing reverse channels according to claim 21, wherein the information of the sharing reverse channels includes at least one of: the number of the sharing reverse channels and the information generated by the sharing reverse channels using long code mask.

24. The method for sharing reverse channels according to claim 23, wherein further comprising the following two steps when the mobile station in idle state has to send reverse signaling on the sharing reverse channels:
step D, the mobile station in idle state turning on reverse emission powers and sending the reverse signaling; and
step E, after sending the reverse signaling, the mobile station in idle state turning down the reverse emission powers.

25. The system for sharing reverse channels according to claim 12, wherein establishing the forward channel and the multiple sharing reverse channels based on at least one of the following information: the number of the mobile stations in the group, the number of base station resources, and air interface wireless resource.

26. The system for sharing reverse channels according to claim 25, wherein determining the sharing reverse channel which could be used by the mobile station by way of the randomization calculating relative to a terminal identification number.

27. The system for sharing reverse channels according to claim 26, wherein the randomization calculating comprises at least one of: HASH function using the terminal identification number as input parameter and the terminal identification number for calculating the number of the sharing reverse channels.

28. The system for sharing reverse channels according to claim 26 wherein the terminal identification number comprises at least one of: terminal electronic sequence number and unicast access terminal identifier.

29. The system for sharing reverse channels according to claim 27, wherein the information of the sharing reverse channels includes at least one of: the number of the sharing reverse channels and the information generated by the sharing reverse channels using long code mask.

30. The system for sharing reverse channels according to claim 29, wherein further comprising the following two means of:
a power emission turning on means for causing the mobile station in idle state turning on reverse emission powers and send the reverse signaling; and
a power emission turning down means for causing the mobile station in idle state turning down the reverse emission powers after sending reverse signaling.

* * * * *